UNITED STATES PATENT OFFICE.

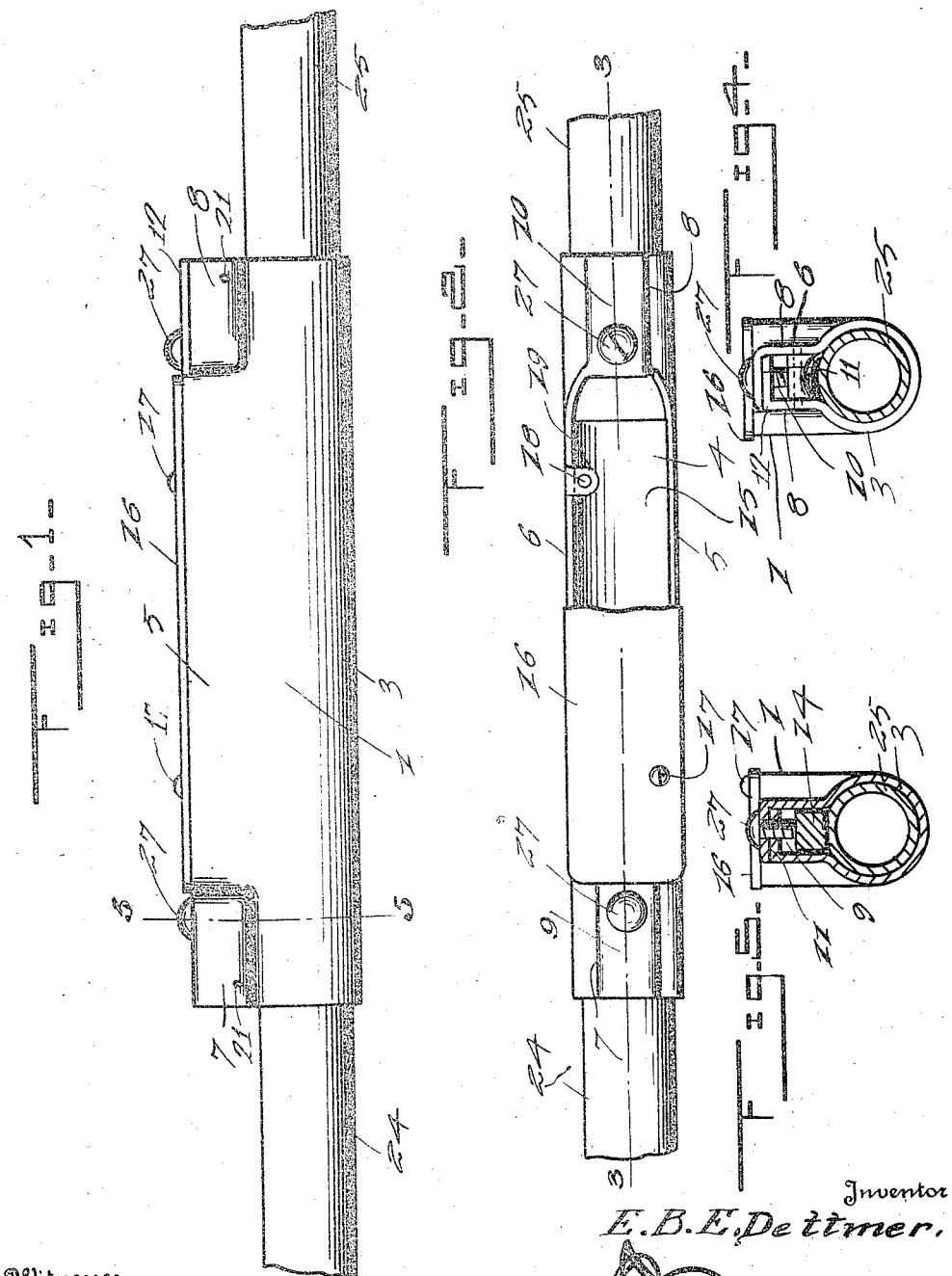

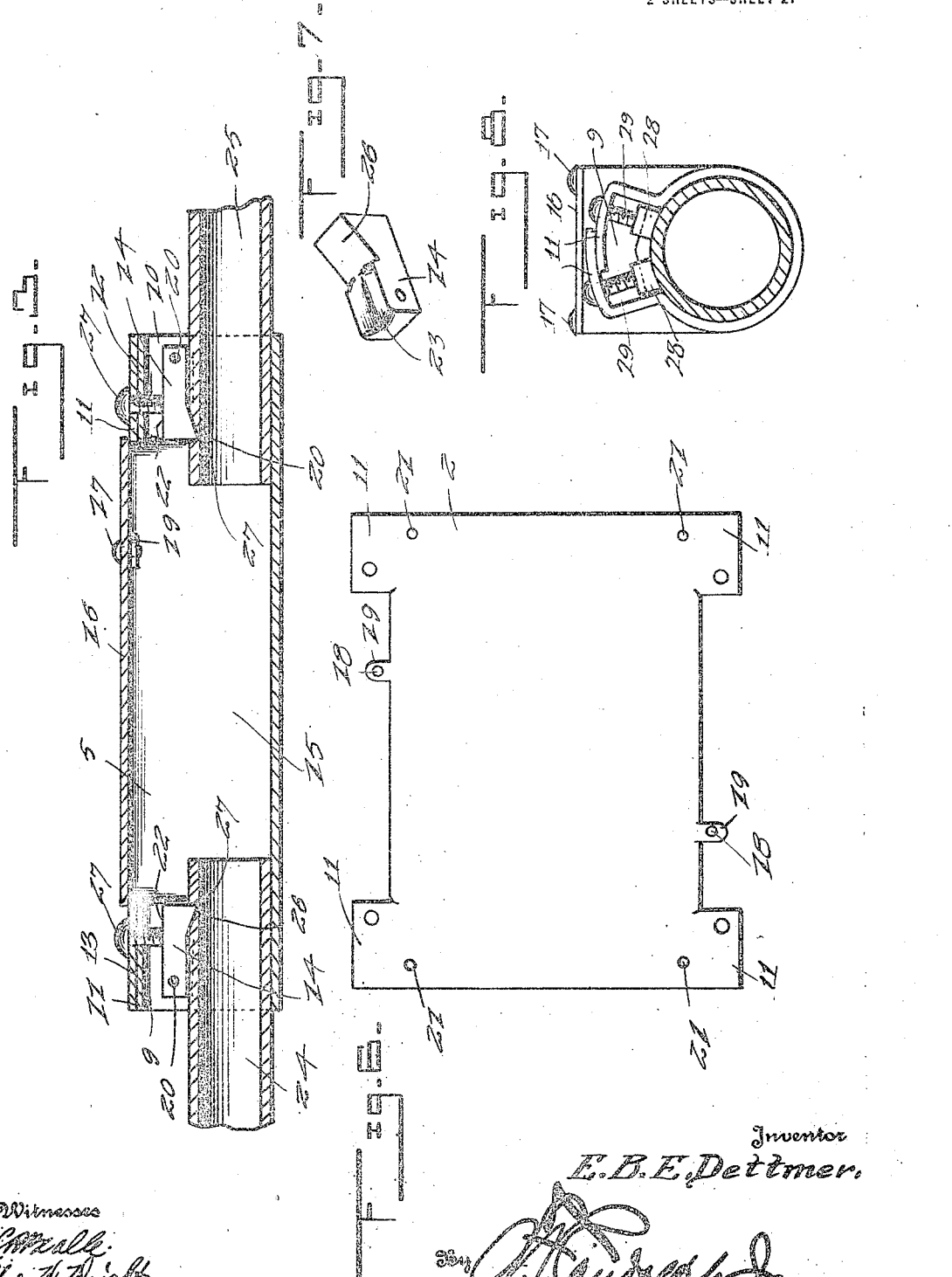

ERWIN B. E. DETTMER, OF CHICAGO, ILLINOIS.

PIPE-COUPLING.

1,295,132.

Specification of Letters Patent.

Patented Feb. 25, 1919.

Application filed February 28, 1917. Serial No. 151,619.

*To all whom it may concern:*

Be it known that I, ERWIN B. E. DETTMER, a citizen of the United States, residing at Chicago, in the county of Cook and State of Illinois, have invented certain new and useful Improvements in Pipe-Couplings; and I do hereby declare the following to be a full, clear, and exact description of the invention, such as will enable others skilled in the art to which it appertains to make and use the same.

This invention relates to pipe couplings and more particularly to couplings for conduit pipes for carrying the electroconductors and has for its object to provide a coupling that can be quickly and conveniently applied or taken off the pipe sections.

Another object is to provide a coupling, that will hold the pipe sections in proper position and lock the same so that the accidental displacement thereof will be eliminated.

A further object is the provision of a means of access to the interior of the coupling, so that repairs may be made to the wires in the coupling without necessitating the removal of the coupling.

A still further object is the provision of a coupling having means at each end thereof to receive a pipe section and having pawls to engage in notches formed in the ends of the pipe sections, and adjustable means to engage the pawls to prevent the same from riding out of the notches.

With these and other objects in view the invention consists in the construction and novel combination and arrangement of parts hereinafter fully described, illustrated in the accompanying drawings and set forth in the claim hereto appended, it being understood that various changes in the form, proportion and minor details of construction may be resorted to without departing from the spirit or sacrificing any of the advantages of the invention.

In the drawings:

Figure 1 represents a side elevation of the improved coupling in its assembled form connecting the adjacent ends of a pair of pipe sections, Fig. 2 is a top plan view of the same showing the cover plate partly in section, Fig. 3 is a longitudinal sectional view taken on the line 3—3 of Fig. 2, Fig. 4 is an end view of the device, Fig. 5 is a detail cross sectional view taken on the line 5—5 of Fig. 1, Fig. 6 is a plan view of the blank, from which the body of the coupling is formed, Fig. 7 is a detail perspective view of one of the pawls, and Fig. 8 is a detail sectional view illustrating a modification of the coupling, in which a pair of pawls is carried at each end of the coupling.

Referring to the drawings in detail the numeral 1 designates generically the improved coupling which is preferably formed from a blank 2. The blank 2 is bent to form a substantially cylindrical body 3 having an open top 4. The body 3 has upstanding plane side walls 5 and 6, which are compressed at each end thereof as at 7 and 8 to provide pawl housings 9 and 10. Ears 11 are formed integral with the blank adjacent each corner thereof and are bent at right angles to the body so as to overlap each other as at 12 and 13 to form the top walls of the pawl housings.

Between the pawl housings is a central chamber 15, which has a cover plate 16, the cover plate 16 being secured to the body by means of suitable fasteners 17, which extend through the cover plate and through apertures 18 formed in the inwardly bent lugs 19 which are formed integral with the blank. The cover plate 16 can be quickly removed so that access may be had to the central chamber 15 when it is desired to make repairs to the conductor wires in the couplings.

The pawl housings each receive a gravity pawl 14 which is pivotally supported adjacent one end thereof by a pin 20, which extends through registering aperture 21, formed in the walls of the pawl housings. Each gravity pawl 14 has a plane upper surface 22 and an inwardly curved lower surface 23, which conforms to the contour of the pipe sections 24 and 25, and has a downwardly extending toothed end 26 which is adapted to be received in a notch 27 formed adjacent each end of the pipe sections 24 and 25.

A screw 27 is adjustably carried by the overlapping ears 11 and engages the plane upper surface 22 of the pawl 14 to prevent the toothed end 26 from riding out of the notches 27. Thus it will be seen that the possibility of the displacement of the pipe couplings is reduced to a minimum.

When the coupling is used for extra large pipes a pair of pawls 28 are provided at each end of the coupling as is clearly illustrated in Fig. 8 of the drawings. An adjustable screw 29 is provided for engaging each of the pawls 28 and the same extends through the ears 11 and into the pawl housings 9 or 10, as in the form illustrated in Figs. 1 to 7.

While the body of the coupling has been shown made from a single of sheet metal it can be readily seen that the same can be constructed of malleable iron or casting.

The coupling has been shown on one type of conduit but the same can be used to the best advantage on any type of conduit, pipe, bushing, rod or shaft.

Having thus described my invention what I claim is:

In combination, of a body, a pair of pipe sections, means formed on each end of the body to receive the pipe sections, pawl housings formed on each end of the body and arranged above the pipe sections, gravity pawls pivotally secured in the pawl housings, and an adjustable screw carried by the pawl housing and arranged to engage the free end of the pawls to prevent the same from riding out of engagement with the sections.

In testimony whereof I affix my signature in presence of two witnesses.

ERWIN B. E. DETTMER.

Witnesses:
HENRY FLEAR,
HOWARD W. OUSLEY.